US012433804B1

(12) United States Patent
Thomas et al.

(10) Patent No.: US 12,433,804 B1
(45) Date of Patent: Oct. 7, 2025

(54) RESCUE SYSTEM

(71) Applicant: Rescue Solutions, LLC, Montgomery, TX (US)

(72) Inventors: Kurt R. Thomas, Montgomery, TX (US); Ryan J. Thomas, Rimon, GA (US)

(73) Assignee: Relentless Rescue Solutions LLC

( * ) Notice: Subject to any disclaimer, the term of this patent is extended or adjusted under 35 U.S.C. 154(b) by 0 days.

(21) Appl. No.: 19/005,211

(22) Filed: Dec. 30, 2024

(51) Int. Cl.

| | |
|---|---|
| ***A61G 1/013*** | (2006.01) |
| ***A61G 1/044*** | (2006.01) |
| ***A61G 1/048*** | (2006.01) |
| ***A62B 7/02*** | (2006.01) |
| ***A62B 9/02*** | (2006.01) |

(52) U.S. Cl.
CPC ............. *A61G 1/013* (2013.01); *A61G 1/044* (2013.01); *A62B 7/02* (2013.01); *A62B 9/02* (2013.01); *A61G 1/048* (2013.01)

(58) Field of Classification Search
CPC ........ A61G 1/013; A61G 1/044; A61G 1/048; A61G 1/04; A62B 7/02; A62B 9/02
USPC ..................................... 5/625, 627, 628, 629
See application file for complete search history.

(56) References Cited

U.S. PATENT DOCUMENTS

| | | | | | |
|---|---|---|---|---|---|
| 2,788,530 | A * | 4/1957 | Ferguson | A61G 1/01 | 5/628 |
| 3,729,002 | A * | 4/1973 | Miller | B63C 11/325 | 5/629 |
| 3,775,782 | A * | 12/1973 | Rice | A61G 1/00 | 128/DIG. 20 |
| 4,736,474 | A * | 4/1988 | Moran | A61G 1/007 | 5/628 |
| 6,053,534 | A * | 4/2000 | Timmerman | A62B 1/02 | 280/845 |
| 6,138,306 | A * | 10/2000 | Muhanna | A61G 1/00 | 5/628 |
| 6,352,460 | B1 * | 3/2002 | Eiband | B63C 9/02 | 441/80 |
| 7,774,877 | B2 * | 8/2010 | Kenalty | A61G 1/01 | 5/81.1 R |
| 8,006,334 | B2 * | 8/2011 | Kenalty | A61G 1/01 | 5/81.1 R |

(Continued)

FOREIGN PATENT DOCUMENTS

| | | | | |
|---|---|---|---|---|
| WO | WO-2011095881 A1 * | 8/2011 | | A61G 1/00 |
| WO | WO-2021015991 A2 * | 1/2021 | | A61G 1/00 |

*Primary Examiner* — Robert G Santos
(74) *Attorney, Agent, or Firm* — Phillip Black; Dossey & Jones PLLC

(57) ABSTRACT

Embodiments of the present invention may comprise a rescue system and/or rescue device. A capsule may have a capsule wall that defines an inner capsule area into which a victim may be configured. A rescue air bottle may supply fresh air to the victim by first inflating an air bladder and then supplying the fresh air from the air bladder to the victim. The victim may inhale the fresh air. The hazardous air may be expelled from the capsule via one or more one-way air flow vents via positive pressure created from flow of rescue air. Webbing may be configured in a cross hatch/grid pattern within the capsule wall to provide structure to the capsule wall. The capsule wall may collapsed when a victim is not configured in the capsule so that the capsule is easily carried by a rescuer.

20 Claims, 7 Drawing Sheets

(56) References Cited

U.S. PATENT DOCUMENTS

| | | | | |
|---|---|---|---|---|
| 8,122,543 | B2 * | 2/2012 | Kenalty | A61G 7/0504 5/81.1 R |
| 8,316,487 | B2 * | 11/2012 | Kenalty | A61G 1/01 5/81.1 R |
| 8,365,326 | B2 * | 2/2013 | Kenalty | A61G 1/044 5/628 |
| 8,713,731 | B2 * | 5/2014 | Kenalty | A61G 1/01 5/81.1 R |
| 8,745,792 | B2 * | 6/2014 | McGlynn | A61G 1/00 5/81.1 R |
| 8,782,833 | B2 * | 7/2014 | Beurguet | A62B 31/00 5/628 |
| 8,881,327 | B2 * | 11/2014 | Kenalty | A61G 1/00 5/628 |
| 9,861,539 | B1 * | 1/2018 | Stickler | A61G 1/044 |
| 9,974,701 | B1 * | 5/2018 | Haskell | A61G 1/044 |
| 10,470,949 | B2 * | 11/2019 | Hiemenz | A61G 7/1051 |
| 11,787,518 | B2 * | 10/2023 | Keesaer | B63C 9/08 441/92 |
| 2003/0106155 | A1 * | 6/2003 | Arai | A61G 1/00 5/625 |
| 2008/0301876 | A1 * | 12/2008 | Kenalty | A61G 1/01 5/620 |
| 2010/0251479 | A1 * | 10/2010 | Kenalty | A61G 7/0504 5/81.1 R |
| 2011/0185504 | A1 * | 8/2011 | Kenalty | A61G 1/044 280/30 |
| 2011/0271445 | A1 * | 11/2011 | Kenalty | A61G 7/0504 5/81.1 R |
| 2012/0102650 | A1 * | 5/2012 | McGlynn | A61G 1/048 5/625 |
| 2012/0131750 | A1 * | 5/2012 | Kenalty | A61G 1/01 5/626 |
| 2012/0284923 | A1 * | 11/2012 | Jensen | A61G 1/00 5/625 |
| 2012/0291203 | A1 * | 11/2012 | Beurguet | A62B 31/00 5/706 |
| 2013/0074267 | A1 * | 3/2013 | Kenalty | A61G 1/01 5/626 |
| 2013/0139319 | A1 * | 6/2013 | Kenalty | B62B 15/007 5/628 |
| 2017/0326007 | A1 * | 11/2017 | Hiemenz | A61G 1/01 |
| 2021/0024186 | A1 * | 1/2021 | Keesaer | A61G 1/048 |

* cited by examiner

RESCUE SYSTEM

BACKGROUND OF THE INVENTION

The present invention relates to rescue systems and devices. In rescue situations such as fires and other immediately dangerous to life or health (IDLH) environments, victims may need to be removed from a dangerous area by a rescuer. Previously, these rescues were performed via victim drags or by utilizing other tools/means, i.e. webbing. Often, these victims within the IDLH environment are found to be unconscious. Generally, this is due to poor air quality from the toxic atmosphere and/or thermal insult or harm from products of combustion. In these scenarios, it is advantageous to provide a system for supplying fresh air to the victim while simultaneously expelling hazardous air away from the victim during the removal from the IDLH environment. Furthermore, during victim removal, protection from other hazardous encounters is a challenge, i.e. additional or continued thermal injuries, obstacles such as melted carpet, glue, nails or superheated water as well as other debris that the victim may be subjected to during the rescue.

SUMMARY OF THE INVENTION

Embodiments of the present invention comprise a rescue system. The rescue system may comprise a capsule with a capsule wall. The capsule wall may define an inner capsule area. A victim may be placed in the capsule inner area and may be secured within the capsule by a plurality of exterior straps. The plurality of exterior straps may be held in a secured position by at least one strap latch, and may be tightened in the secured position by at least one strap cinch. A cross body strap may be configured across the victim's body to secure the victim within the capsule. A lower body strap may be configured across the victim's legs to secure the victim within the capsule. Alternatively, the lower body strap may be configured about the capsule wall but not about the victim. This may still serve to secure any size victim within the capsule by restricting the movement of the victim from one end of the capsule to the other.

At least a portion of the capsule wall may comprise phosphors that may absorb energy such as light from an external source. Upon absorbing energy and thereby becoming energized, the phosphors may emit visible light and thereby "glow" to make the capsule wall easier to see. Likewise, at least a portion of the capsule wall may comprise reflectors that reflect visible light to make the capsule wall easier to see. The phosphors, reflectors, or combinations of both are referred to herein as "capsule wall visual aids". The capsule wall visual aids may direct light away from the capsule so that it can be seen be a rescuer. The capsule wall visual aids may direct the light by emitting light upon being energized or by reflecting light from an external source. The capsule wall visual aids may aid in locating the capsule in a dark environment. The capsule wall visual aids may further aid in using the capsule in a dark environment since portions of the capsule wall may be more visible to a rescuer due to the phosphors and/or reflectors.

An air bladder may be configured within the inner capsule area. A rescue air bottle may supply rescue air (i.e. fresh air) to the air bladder. An air flow activation mechanism may be configured to control the flow of rescue air from the rescue air bottle to the air bladder and to the inner capsule area. When the rescue air is supplied from the rescue air bottle to the air bladder, the air bladder may inflate. The inflated air bladder may provide a cushion between the victim's head and the capsule wall. The rescue air may be supplied to the victim from the air bladder via a one-way air flow vent so that the victim may inhale the rescue air. The victim and the capsule may exhaust and/or exhale hazardous air, which may be expelled from the capsule via a one-way air flow vent. The one-way air flow vents may allow air to flow in one direction so that hazardous air is exhaled from the victim and then expelled from the capsule. This ensures fresh air within the capsule to create a sustainable environment for rapid rescue.

A drag loop may be connected to the capsule wall. The drag loop may also be referred to as a hoist loop. A rescuer may use the drag loop to drag the capsule containing the victim. Handles may also be connected to the capsule wall so that the rescuer may use the handles to drag the capsule containing the victim. Alternatively, multiple rescuers may drag and/or carry the capsule containing the victim by grasping the drag loop and/or one or more of the handles and moving the capsule using manual force. The handles may protrude from multiple sides of the capsule so that rescuers may be configured at multiple points about a perimeter of the capsule.

Webbing may be configured on the capsule wall to provide structural support for the capsule wall. The webbing may be made of the same material as the plurality of exterior straps. The webbing may have a greater thickness than the thickness of the plurality of exterior straps. This is so the webbing better retains its shape so that it better provides structural support for the capsule wall. The webbing may be configured in a cross hatch/grid pattern to provide optimal structural support for the capsule wall.

When no victim is configured within the capsule inner area, the air bladder may be deflated. The capsule wall may be collapsed by rolling, folding, or a combination of both in order to configure the capsule in a compact shape. A rapid deployment mechanism may be used to retain the capsule in the compact shape. The rapid deployment mechanism may be a non-permanent attachment feature such as but not limited to a button, snap, buckle, or hook-and-loop feature. The rapid deployment mechanism may removably attach to the capsule wall, one of the plurality of exterior straps, one of the handles, or the webbing to retain the capsule in the compact shape. The rapid deployment mechanism may be released to unfurl the capsule wall so that a victim may be configured within the inner capsule area.

When the capsule is configured in a compact shape, the air bladder and the rescue air bottle may be secured within the capsule. A rescuer may don the drag loop to carry the capsule when the capsule is configured in a compact shape. In this manner, the capsule may be configured to be easily carried by a rescuer when no victim is configured within the capsule.

The victim may be a rescue victim such as but not limited to a person affected by a traumatic injury, smoke inhalation, burns, or a victim affected by cardiac arrest. The capsule may be sized to hold human victims of any size. When an adult victim is configured within the inner capsule area, the cross body straps and the lower body straps may be configured across the victim. When a child victim is configured within the inner capsule area, only the cross body straps may be configured across the victim due to the smaller size of the victim.

The rescue air may be breathable air, such as that found in SCBA (self-contained breathing apparatus) cylinders. "Hazardous air" may mean air unhealthy for breathing and may include air contaminated with toxins and/or air pollutants. Hazardous air may include air that contains harmful particles and/or chemicals consistent with biproducts of combustion such as but not limited to superheated gases, hydrogen cyanide, carbon monoxide. Toxic air pollutants are pollutants which are hazardous to human health or the environment. Hazardous air in a fire environment is a mixture of toxic pollutants, or hazardous air pollutants (HAPs), that can be released into the air during fires. HAPs are substances that can cause or are suspected of causing serious health effects, such as cancer, birth defects, or reproductive effects. They can be gases, compounds, or metals, such as benzene, toluene, hydrogen chloride, asbestos, cadmium, mercury, and chromium. Hazardous air can also be present in non-fire environments, such as during a chemical spill or chemical reaction. The one-way air flow vents may allow particles of breathable size to exit the capsule via the one-way air flow vents. These particles of breathable size may be 20 microns or smaller, 10 microns or smaller, 5 microns or smaller, or any size including and between the values provided.

The capsule wall, the plurality of exterior straps, the webbing, the handles, and the drag loop may be all be made of the same material. This material may be but is not limited to that of structural fire rated personal protective equipment (PPE) that could consist of materials such as canvas, rubber, nylon, polyester, or Kevlar®. Alternatively, these components may be made of different materials. For example, the capsule wall may be made of canvas whereas the webbing may be made of polyester. The components of the rescue system may be heat resistant up to similar or more values as that of structural firefighting PPE, which is heat resistant to upwards of 1000 degrees Fahrenheit. Certain components, such as the capsule wall and the webbing, may have thicknesses that are greater than the other components due to the wear expected to occur on these components. The capsule wall may comprise an upper capsule wall and a lower capsule wall. The lower capsule wall may contact the ground when the capsule is dragged along the ground. Therefore, the lower capsule wall may have a greater thickness than the upper capsule wall. The lower capsule wall may also be made of a more wear-resistant material than the upper capsule wall. Capsule wall visual aids may be configured on the upper capsule wall and/or lower capsule wall. The capsule wall visual aids may direct light away from the capsule by emitting light upon being energized or by reflect light from an external source. This may aid a rescuer in seeing the capsule wall in a dark environment.

Combinations of the features of the rescue system may make up a rescue device. The rescue device may comprise the capsule with the capsule wall defining the capsule inner area, the plurality of exterior straps, the handles, the webbing, the air bladder, the rescue air bottle, the one-way air flow valves, the strap latch, the strap cinch, a zipper, the rapid deployment mechanism, the air flow activation mechanism, and any other components of the rescue system described herein. These components may function exactly the same as described in relation to the rescue system when making up the rescue device.

The dotted lines in the figures show internal components of the rescue device that would not otherwise be visible.

DETAILED DESCRIPTION OF THE INVENTION

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms “a”, “an”, and “the are intended to include the plural forms as well, unless the context clearly indicates otherwise. It will be further understood that the terms “comprises” and/or “comprising” or “includes” and/or “including” when used in this specification, specify the presence of stated features, regions, integers, steps, operations, elements, and/or components but do not preclude the presence or addition of one or more other features, regions, integers, steps, operations, elements, components, and/or groups thereof.

Figure 1:
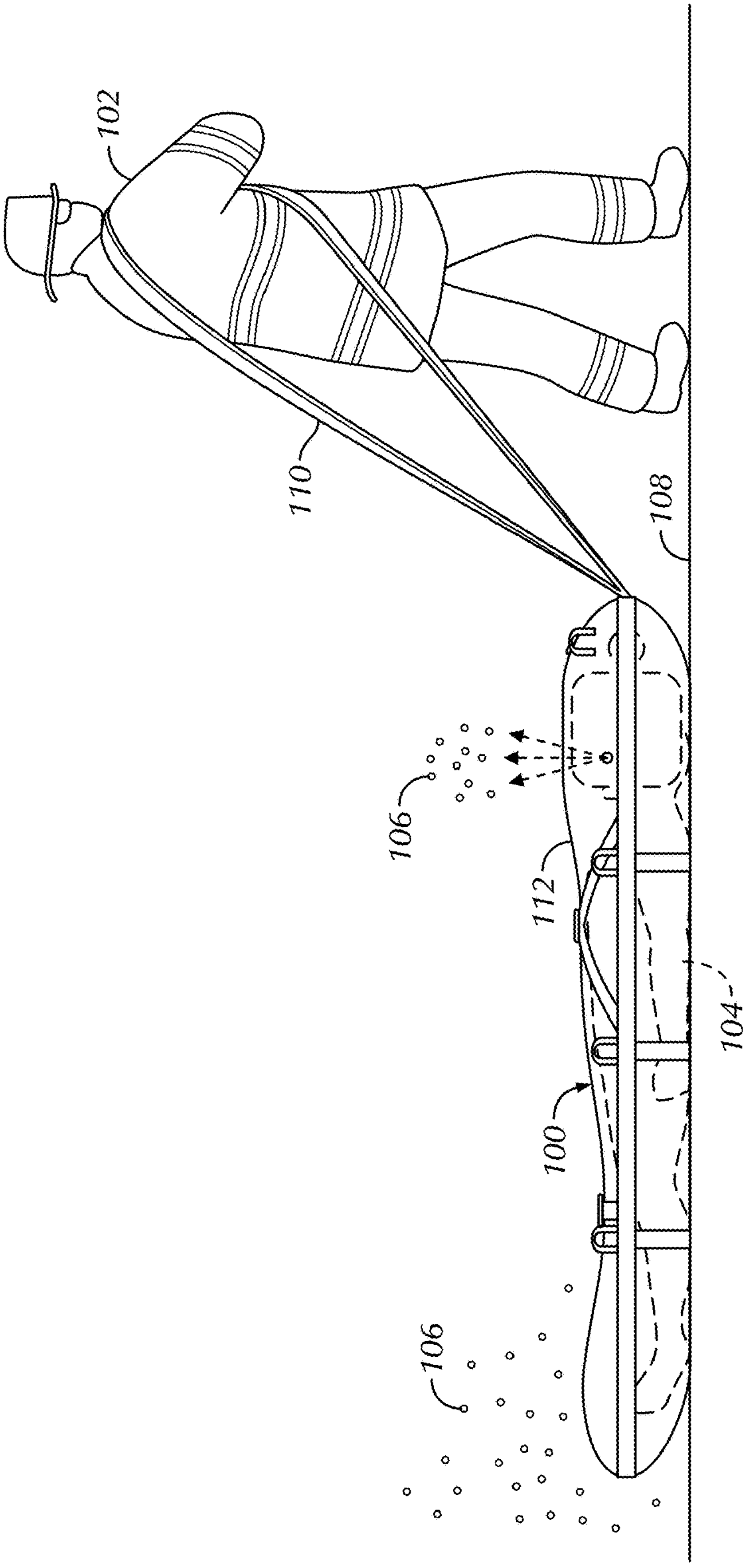
FIG. 1 shows a right-side view of a rescuer pulling a rescue device.

As shown in FIG. 1, a capsule 100 of a rescue system encases a victim 104 within a capsule wall 112. The capsule 100 is configured such that the victim 104 is laying horizontally relative to the ground 108. The capsule 100 containing the victim 104 is dragged across the ground 108 by a rescuer 102. The rescuer 102 uses a drag loop 110 attached to the capsule wall 112 to pull the capsule 100. Positive pressure created by rescue air exhausts hazardous air 106 away from the victim 104 and out of the capsule 100 via one-way air flow vents in the capsule wall 112. The one-way air flow vents will not allow the hazardous air 106 to return into the capsule 100 to be breathed by the victim 104.

Figure 2:
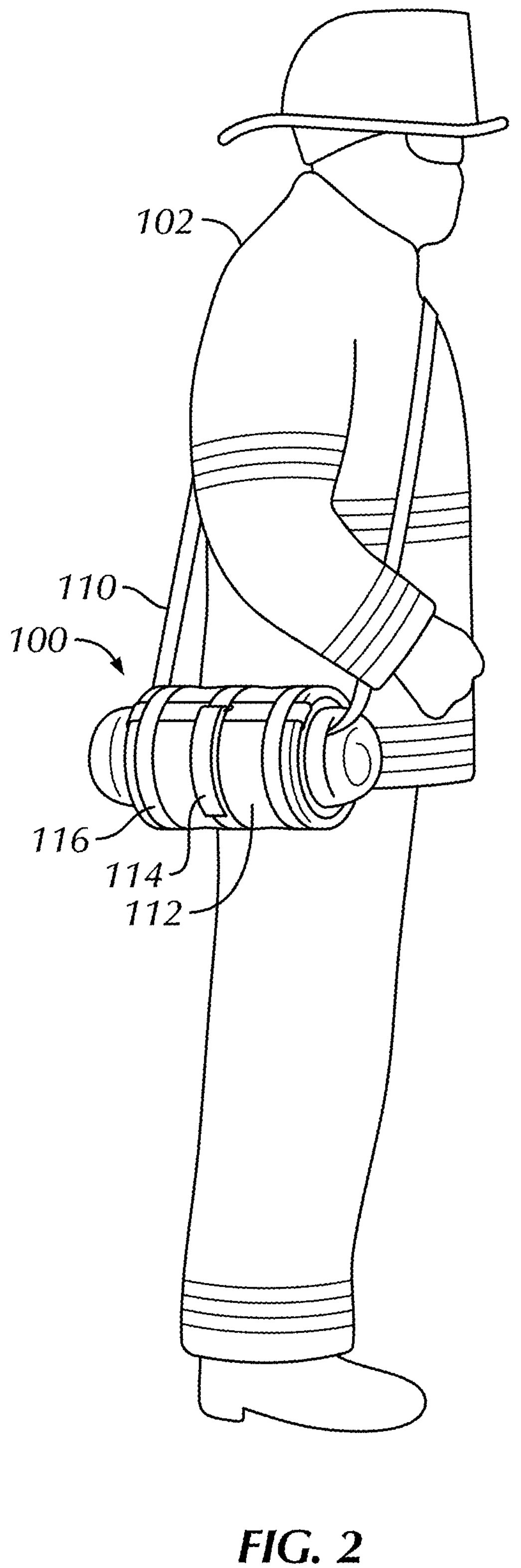
FIG. 2 shows a right-side view of a rescuer donning a rescue device to carry the rescue device.
Figure 3:
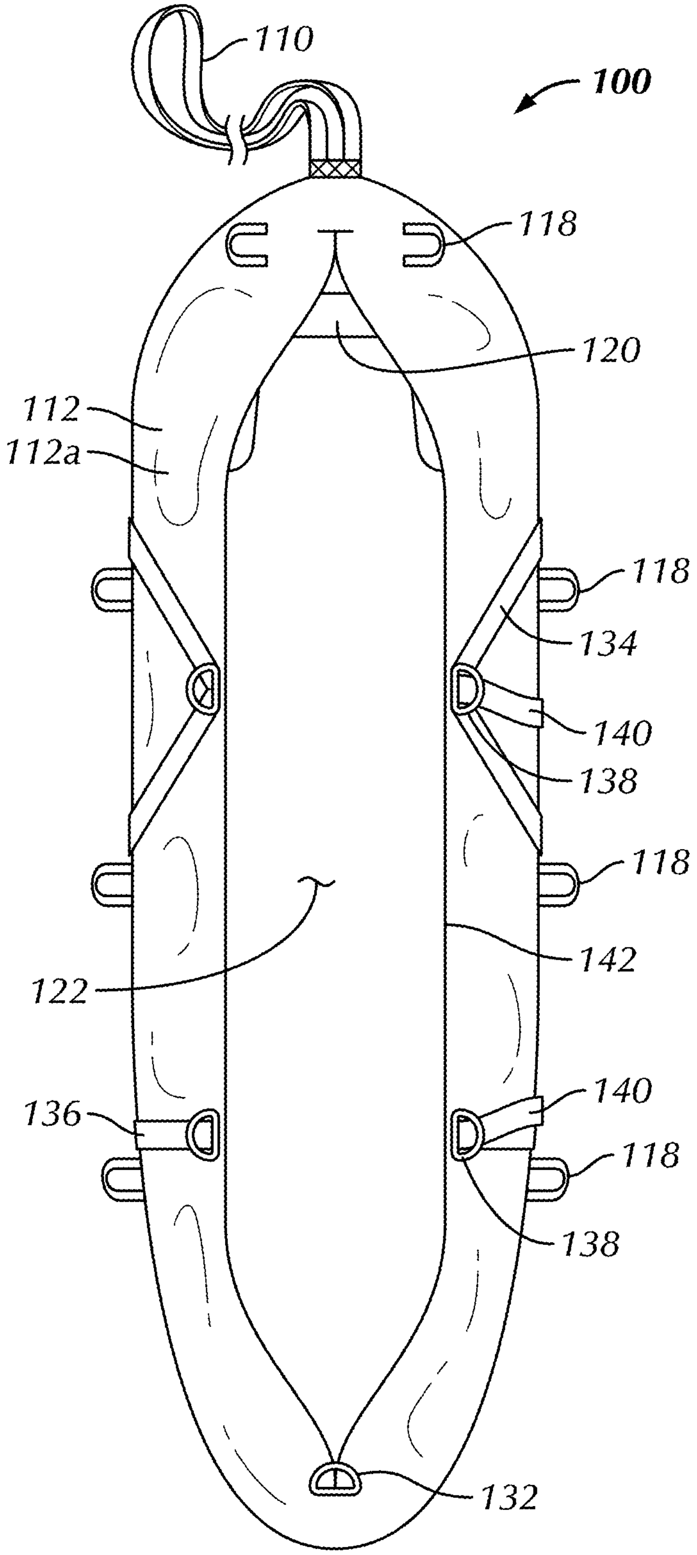
FIG. 3 shows a top view of a rescue device.

As shown in FIG. 2, the capsule wall 112 is collapsed to configure the capsule 100 in a compact shape. The capsule wall 112 may be collapsed by folding the capsule wall 112 onto itself, rolling the capsule wall 112 onto itself, or a combination of both. The capsule 100 is secured in the compact shape by a rapid deployment mechanism 114. The rapid deployment mechanism 114 may exist as a strap with an attachment feature such as but not limited to a button, a snap, a zipper, or a hook-and-loop mechanism. The rapid deployment mechanism 114 may be removably attached to the capsule wall 112.

Alternatively, the rapid deployment mechanism 114 may be removably attached to webbing 116 of the capsule 100. The webbing 116 may exist as strips of material permanently connected to the capsule wall 112 to provide structural support to the capsule wall 112. The rapid deployment mechanism may be removed from the capsule wall 112 or webbing 116 so that the capsule wall 112 may be unfurled to deploy the capsule 100 in a configuration whereby the capsule 100 may accept a victim.

In the compact shape, the capsule 100 is donned by the rescuer 102. The rescuer may don the drag loop 110 or another strap feature of the capsule 100 over the rescuer's shoulders to conveniently carry the capsule 100 on their back. This allows the rescuer 102 to use their hands for other tasks while simultaneously carrying the capsule 100.

As shown in FIGS. 3-7B, the capsule wall 112 is unfurled whereby the capsule 100 may accept a victim 104/144. The capsule wall 112 defines a capsule inner area 122 into which the victim 104/144 may be placed. The victim 104/144 may be placed into the capsule inner area 122 via an opening in an upper capsule wall 112*a*. The opening may be opened and shut using a closure mechanism 142 configured on the upper capsule wall 112*a*. The closure mechanism 142 may be a zipper or another closure mechanism such as but not limited to buttons, snaps, or hook-and-loop features. In embodiments wherein the closure mechanism 142 is a zipper, a zipper pull 132 is configured at one end of the capsule 100. The zipper pull 132 may be pulled to the other end of the capsule 100 to open and close the zipper 142. The zipper pull 132 is sized so that it is easily grasped by a rescuer so that the rescuer may quickly activate the zipper 142 in emergency situations.

The drag loop 110 extends from one end of the capsule 100. In addition to the drag loop 110, grab handles 118 extend from the capsule wall 112. The grab handles 118 may be configured at various locations about the capsule wall 112 such that multiple rescuers may use the grab handles 118 to drag and/or carry the capsule 100. As shown in FIGS. 3-7B, eight grab handles 118 extend laterally from the capsule wall 112. This is not intended to limit the number of grab handles 118 to exactly eight grab handles. Various embodiments of the present invention may comprise more or less grab handles.

Figure 7A:
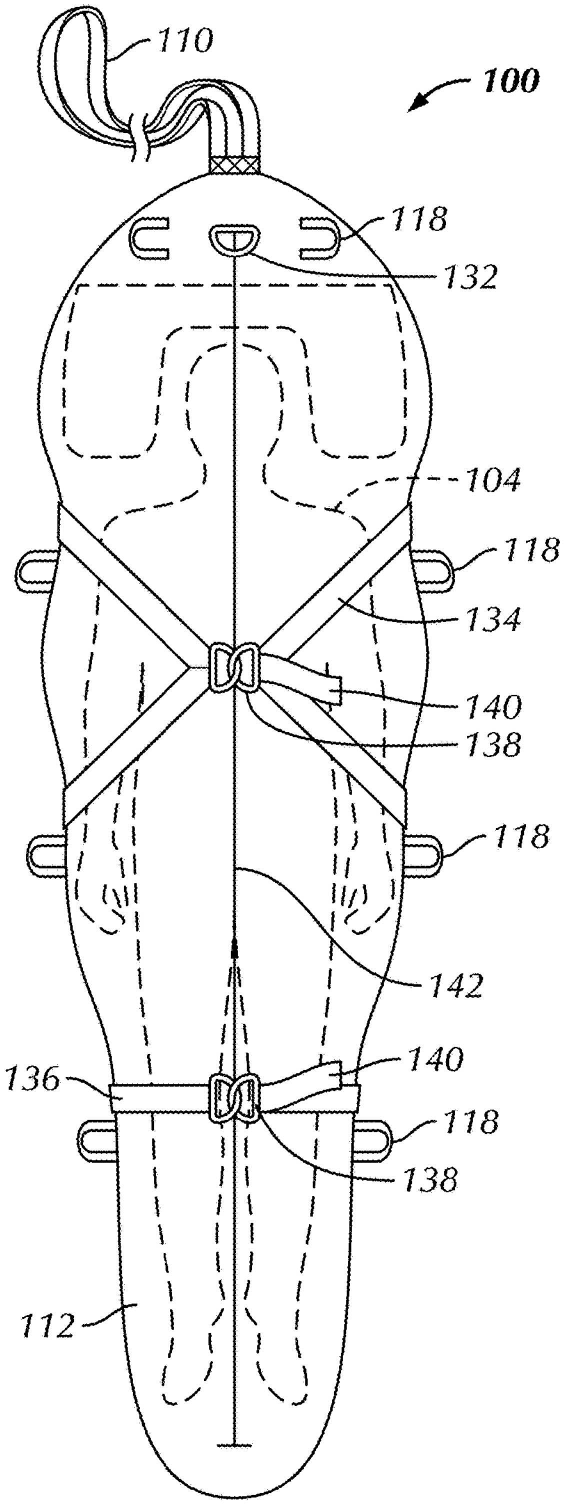
FIG. 7A shows a top view of a rescue device containing an adult victim.
Figure 7B:
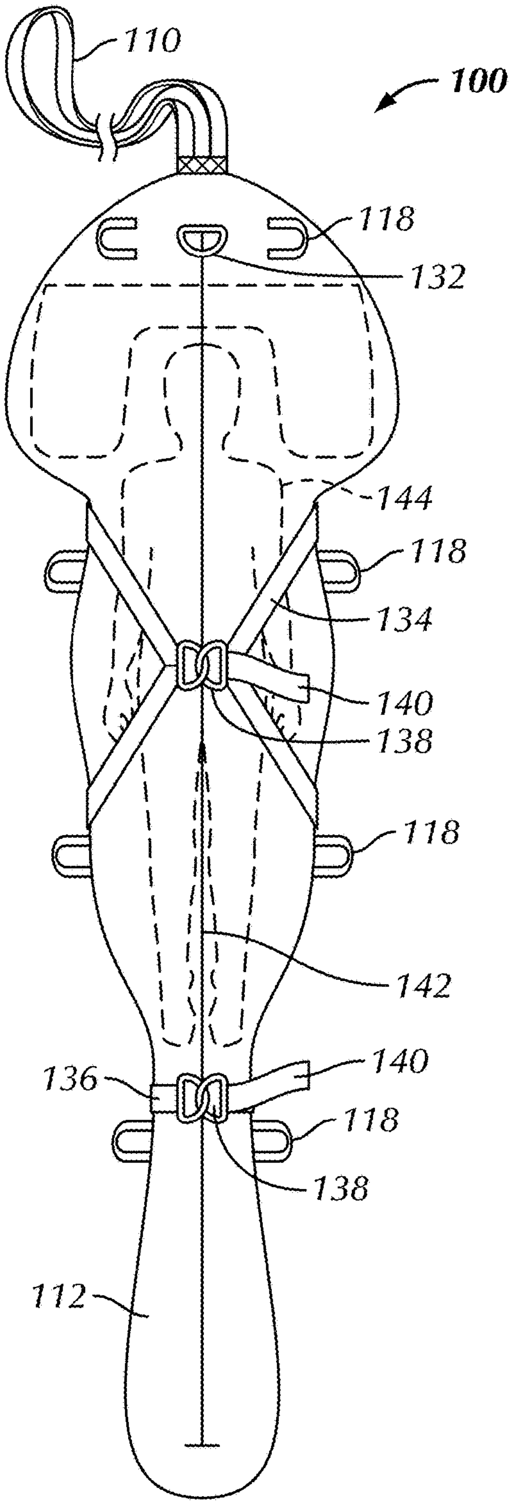
FIG. 7B shows a top view of a rescue device containing a child victim.

Cross body straps 134 are configured at the upper capsule wall 112*a* on either side of the opening. The cross body straps 134 may be connected to one another by threading a strap cinch 140 through a strap latch 138 associated with each cross body strap 134 and pulling the strap cinch 140 tight. As shown in FIG. 7A, the victim 104 is an adult with a larger body size. For adult victims 104, the cross body straps 134 are configured across the victim's chest when the cross body straps 134 are connected to one another. As shown in FIG. 7B, the victim 144 is a child with a smaller body size. For child victims 144, the cross body straps 134 are configured across the victim's abdomen when the cross body straps 134 are connected to one another.

Lower body straps 136 are also configured at the upper capsule wall 112*a* on either side of the opening. The lower body straps 136 may also be connected to one another by threading a strap cinch 140 through a strap latch 138 associated with each lower body strap 136 and pulling the strap cinch 140 tight. For adult victims 104, the lower body straps 136 are configured across the victim's legs when the lower body straps 136 are connected to one another. For child victims 144, when the lower body straps 136 are connected to one another they are configured across the upper capsule wall 112*a* but not across any part of the victim 144 due to the victim's size. While the lower body straps 136 may not directly secure the child victim 144 within the capsule 100, they do contract the capsule wall 112 to prevent the victim 144 from moving from one end of the capsule 100 to the other. Therefore, the lower body straps 136 aid in securing the child victim 144 within the capsule 100.

The cross body straps 134 and lower body straps 136 may serve to secure the victim 104/144 in place when the capsule 100 is used to move the victim 104/144 from one location to another. This may prevent the victim 104/144 from sustaining an injury due to being jostled within the capsule 100. Securing the victim 104/144 in place may further serve to make the capsule 100 easier to move since shifting of the victim's weight about the capsule 100 is minimized during movement of the capsule 100.

Figure 4:
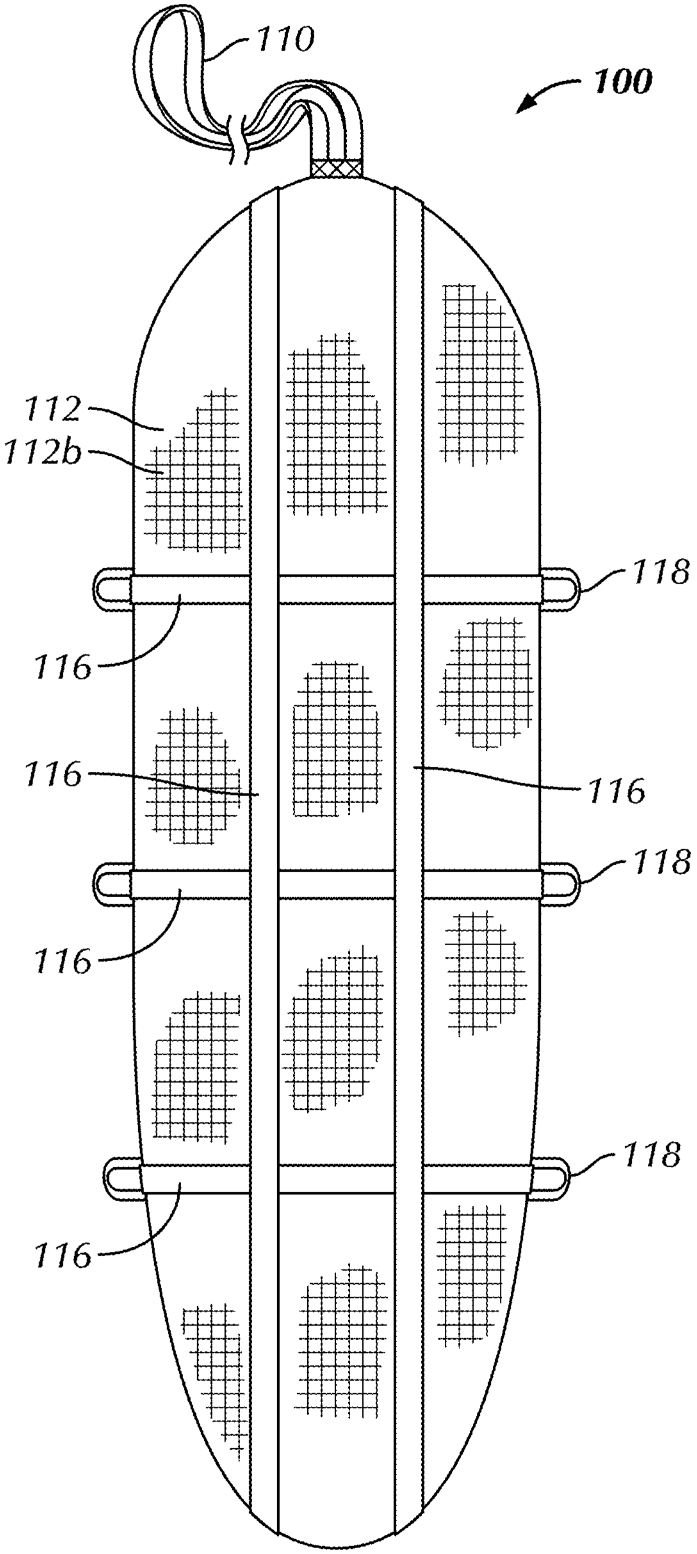
FIG. 4 shows a bottom view of a rescue device.
Figure 5:
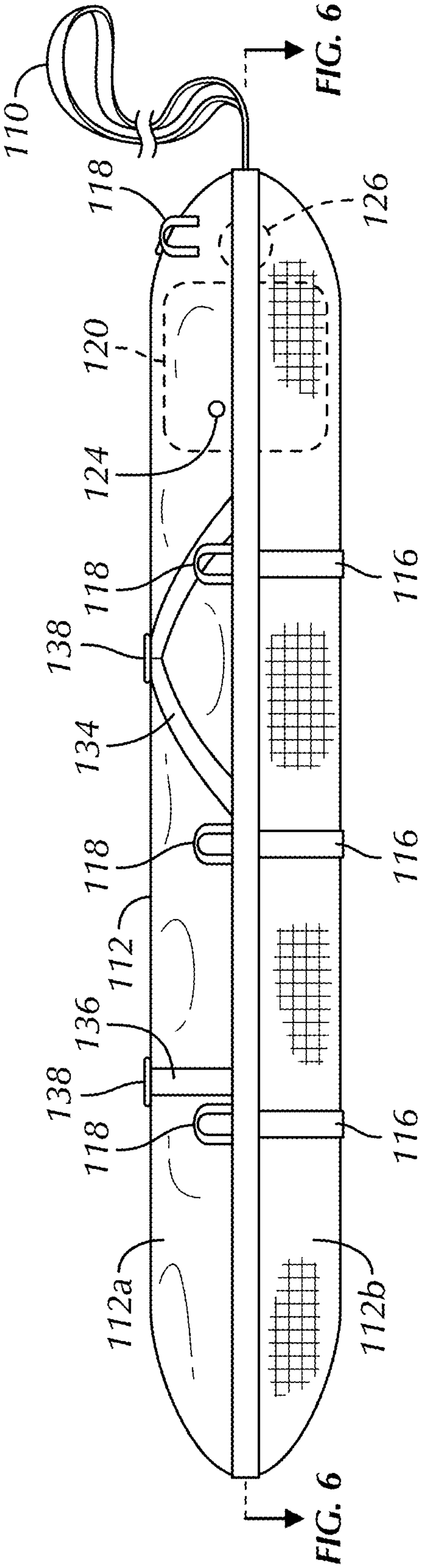
FIG. 5 shows a right-side view of a rescue device.

Webbing 116 is configured within the lower capsule wall 112*b*. The webbing 116 may provide structure to the lower capsule wall 112*b* so that the lower capsule wall 112*b* does not collapse on itself unintentionally when a victim is configured within the capsule inner area 122. The lower capsule wall 112*b* may be configured against the ground when the capsule 100 is dragged across the ground. Therefore, the lower capsule wall 112*b* may have a greater thickness than the upper capsule wall 112*a*. Furthermore, the presence of the webbing 116 at the lower capsule wall 112*b* may allow the capsule to be easily dragged across the ground by providing a stiff bottom of the capsule 100 that may slide over rocks, bumps, divots, or other imperfections on the ground. As shown in FIG. 4, some webbing 116 extends widthwise across the lower capsule wall 112*b*, and other webbing 116 extends lengthwise across the lower capsule wall 112*b*. This creates a cross hatch pattern or grid pattern of webbing 116 that provides optimal structural support for the lower capsule wall 112*b* while using a minimal amount of webbing 116.

An air bladder 120 is configured at one end of the capsule 100. The air bladder 120 is configured within the capsule inner area 122 and may supply rescue air 130 (i.e. fresh air) to the victim 104/144. A rescue air bottle 126 provides rescue air 130 to the air bladder A 120. The rescue air 130 is then directed from the air bladder 120 to the victim 104/144 so that the victim 104/144 can breathe the rescue air 130. The rescue air may further be directed into the inner capsule area 122. This creates a positive pressure that will help expel hazardous air 106 away from the victim 104/144. The one-way air flow vents 124 allow the hazardous air 106 to escape the capsule 100 but do not allow the hazardous air 106 to re-enter the capsule 100, therefore protecting the victim 104/144 from re-inhaling the hazardous air 106.

The flow of rescue air 130 from the rescue air bottle 126 to the air bladder 120 is controlled by an air flow activation mechanism 128. The air flow activation mechanism 128 may be a valve configured between the rescue air bottle 126 and the air bladder 120. When a victim 104/144 is configured within the capsule inner area 122, the air flow activation mechanism 128 may be configured to allow rescue air 130 to flow from the rescue air bottle 126 into the air bladder 120 thereby inflating the air bladder 120. When a victim is not configured within the capsule inner area 122, the air flow activation mechanism 128 may be configured to stop the flow of rescue air 130 from the rescue air bottle 126 to the air bladder 120. The air bladder may then be deflated, which may aid in collapsing the capsule wall 112 so that the capsule 100 can be carried by a rescuer.

Figure 6:
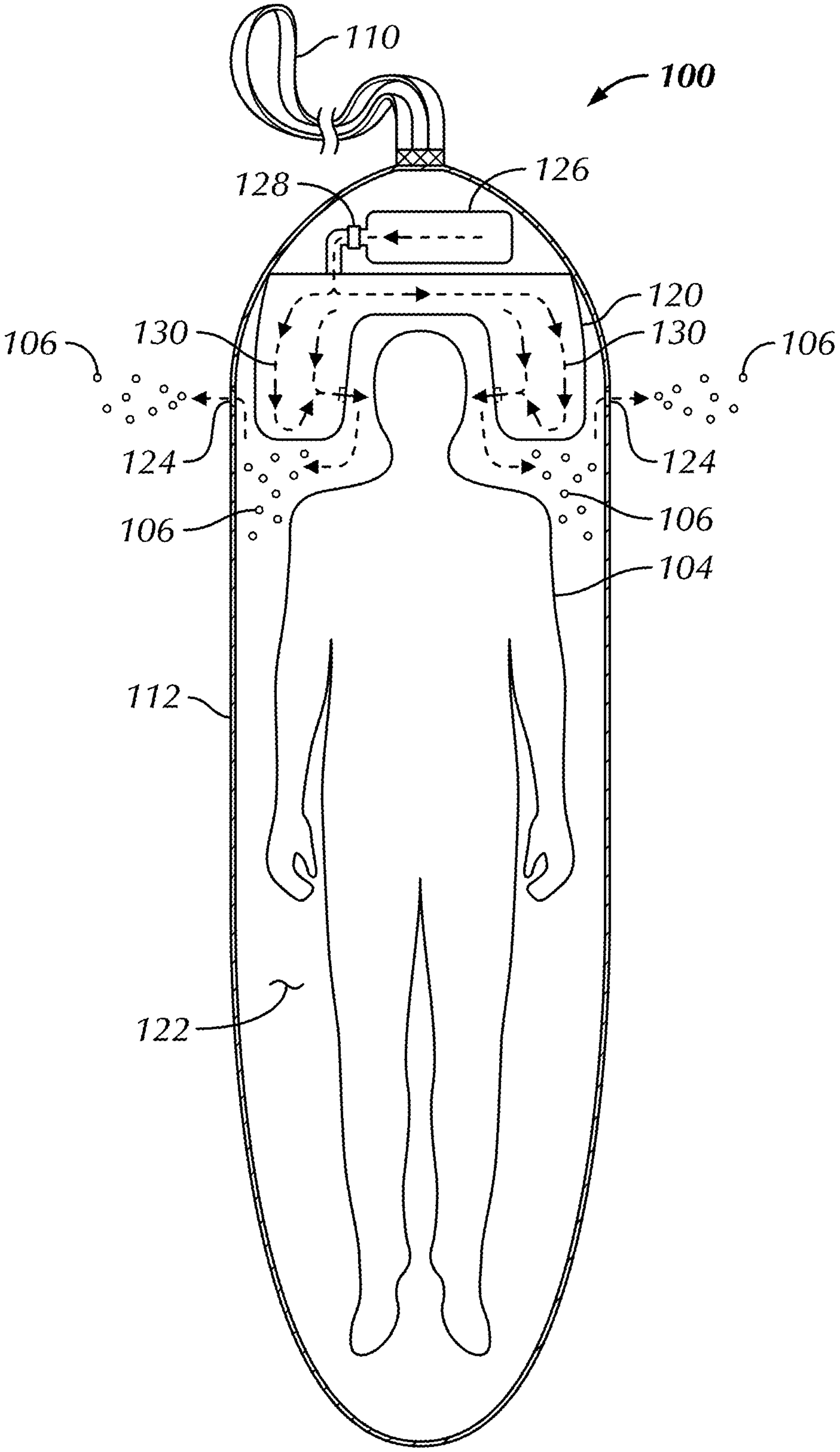
FIG. 6 shows a top cross-sectional view of a rescue device containing a victim.

When the air bladder 120 is inflated, it may serve as a head securement for the victim 104/144. As shown in FIGS. 6-7B, the air bladder 120 has two flanges that extend adjacent to each side of the victim's head. This may restrict movement of the victim's head within the capsule inner area 122, which may be useful if the victim 104/144 has suffered a spinal injury and therefore risks further spinal damage by exhibiting head movement. Rescue air 130 may be supplied to the victim 104/144 from the air bladder 120 by one or more one-way air flow vents that allow rescue air 130 to exit the air bladder 120 but that do not allow hazardous air 106 to enter the air bladder 120.

The one or more one-way air flow vents of the air bladder 120 may be configured on the flanges of the air bladder 120 so that they are configured closer to the victim's nose and mouth. Similarly, the one-way air flow valves 124 used for expelling hazardous air 106 from the capsule 100 may be configured at locations along the capsule wall 112 to be as close as possible to the victim's nose and mouth. This provides less opportunity for hazardous air 106 to become trapped within the capsule inner area 122 and therefore to be re-inhaled by the victim 104/144.

The invention claimed is:

1. A rescue system comprising:

a capsule comprising a capsule wall, the capsule wall defining a capsule inner area;

an air bladder configured within the capsule inner area;

a rescue air bottle;

an air flow activation mechanism;

a one-way air flow vent;

a plurality of exterior straps; and a drag loop, wherein in the capsule inner area is configured to encase a victim and the plurality of exterior straps is configured to secure the victim in the capsule, wherein the air flow activation mechanism causes fresh air to be moved from the rescue air bottle to the air bladder, wherein the fresh air is supplied to the victim from the air bladder, wherein hazardous air is expelled from the capsule via the one-way air flow vent created by positive pressure from the fresh air, wherein the drag loop is configured to allow a rescuer to drag the capsule configured to contain the victim.

2. The system of claim 1, wherein the air bladder is configured to provide a cushion between the victim's head and the capsule wall.

3. The system of claim 1, wherein the capsule wall comprises:

an upper capsule wall;

a lower capsule wall; and capsule wall visual aids that direct light away from the capsule wall, wherein the lower capsule wall has a greater thickness than the upper capsule wall, wherein both the upper capsule wall and the lower capsule wall are heat resistant.

4. The system of claim 1, wherein when no victim is configured in the capsule inner area, the capsule wall is collapsed whereby the capsule is configured in a compact shape, wherein the capsule is retained in the compact shape by securing a rapid deployment mechanism, wherein the drag loop is configured to be donned by the rescuer to carry the capsule, wherein the rapid deployment mechanism is released to unfurl the capsule wall whereby the victim may be configured within the capsule inner area.

5. The system of claim 4, wherein when no victim is configured in the capsule inner area, the air bladder is deflated to allow the capsule to be configured in the compact shape, and wherein the air bladder and the air rescue bottle are secured within the capsule when the rescuer carries the capsule.

6. The system of claim 1, further comprising webbing configured within the capsule wall, wherein the webbing provides structural support for the capsule wall.

7. The system of claim 1, further comprising handles protruding from the capsule wall, wherein the rescuer uses the handles to drag the capsule containing the victim.

8. The system of claim 1, wherein the plurality of exterior straps are held in a secured position by at least one strap latch, and wherein the plurality of exterior straps are tightened in the secured position by at least one strap cinch.

9. The system of claim 1, wherein the plurality of exterior straps comprises:

a cross body strap configured across the victim's body; and a lower body strap configured across the victim's legs.

10. The system of claim 1, wherein the plurality of exterior straps comprises:

a cross body strap configured across the victim's body; and a lower body strap configured about the capsule wall but not about the victim.

11. A rescue device comprising:

capsule wall, the capsule wall defining a capsule inner area;

an air bladder configured within the capsule inner area;

a rescue air bottle;

an air flow activation mechanism;

a one-way air flow vent;

a plurality of exterior straps connected to the capsule wall; and a drag loop, wherein a victim is placed in the capsule inner area and is secured in the device by the plurality of exterior straps is configured to secure the victim in the capsule, wherein the air flow activation mechanism causes fresh air to be moved from the rescue air bottle to the air bladder, wherein the fresh air is supplied to the victim from the air bladder, wherein hazardous air is exhausted from the capsule via positive pressure created by the fresh air exiting out the one-way air flow vent, wherein the drag loop is configured to allow a rescuer the device configured to contain the victim.

12. The device of claim 11, wherein the air bladder is configured to provide a cushion between the victim's head and the capsule wall.

13. The device of claim 11, wherein the capsule wall comprises:

an upper capsule wall;

a lower capsule wall; and capsule wall visual aids that direct light away from the capsule wall, wherein the lower capsule wall has a greater thickness than the upper capsule wall, wherein the plurality of exterior straps are connected to the both the upper and lower capsule wall, wherein both the upper capsule wall and the lower capsule wall are heat resistant.

14. The device of claim 11, wherein when no victim is configured in the capsule inner area, the capsule wall is collapsed whereby the device is configured in a compact shape, wherein the device is retained in the compact shape by securing a rapid deployment mechanism, wherein the drag loop is configured to be donned by the rescuer to carry the device, wherein the rapid deployment mechanism is released to unfurl the capsule wall whereby the victim may be configured within the capsule inner area.

15. The device of claim 14, wherein when no victim is configured in the capsule inner area, the air bladder is deflated to allow the device to be configured in the compact shape.

16. The device of claim 11, further comprising webbing configured within the capsule wall, wherein the webbing provides structural support for the capsule wall.

17. The device of claim 11, further comprising handles protruding from the capsule wall, wherein the rescuer uses the handles to drag the capsule containing the victim.

18. The device of claim 11, wherein the plurality of exterior straps are held in a secured position by at least one strap latch, and wherein the plurality of exterior straps are tightened in the secured position by at least one strap cinch.

19. The device of claim 11 wherein the plurality of exterior straps comprises:

a cross body strap configured across the victim's body; and a lower body strap configured across the victim's legs.

20. The device of claim 11 wherein the plurality of exterior straps comprises:

a cross body strap configured across the victim's body; and a lower body strap configured about the capsule wall but not about the victim.

* * * * *